(No Model.)

T. C. BLANCHARD.
BOX FASTENER.

No. 556,245. Patented Mar. 10, 1896.

Attest:
Edw. P. Durall Jr.
A. W. Bayard,

Inventor.
Thomas C. Blanchard
per Fred B. Tasker,
Atty

UNITED STATES PATENT OFFICE.

THOMAS C. BLANCHARD, OF HERTFORD, NORTH CAROLINA.

BOX-FASTENER.

SPECIFICATION forming part of Letters Patent No. 556,245, dated March 10, 1896.

Application filed July 1, 1895. Serial No. 554,596. (No model.)

*To all whom it may concern:*

Be it known that I, THOMAS C. BLANCHARD, a citizen of the United States, residing at Hertford, in the county of Perquimans and State of North Carolina, have invented certain new and useful Improvements in Egg-Baskets; and I do hereby declare the following to be a full, clear, and exact description of the invention, such as will enable others skilled in the art to which it appertains to make and use the same.

This invention relates to an improvement in baskets or boxes for transporting articles of various kinds, and especially useful for carrying eggs and similar small articles of merchandise, the object of the invention being to construct and provide a cheap and handy carrying device, whereby the articles mentioned may be transported by hand with facility.

The invention relates more particularly to improved means for locking the cover of the basket or box in place thereon, so as to prevent the untimely exit and loss of any of the articles contained therein.

The invention therefore consists essentially in the improved cover-securing means herein described, and then more particularly pointed out in the appended claims.

Figures 1, 6:
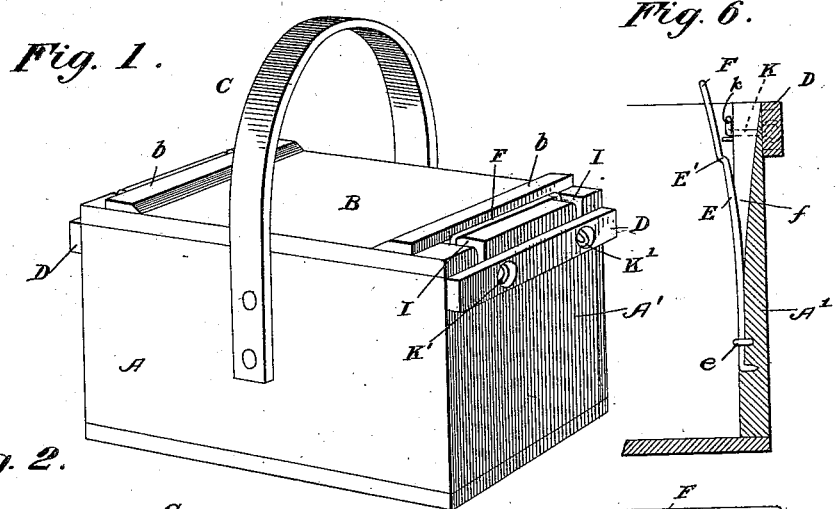
Figure 2:
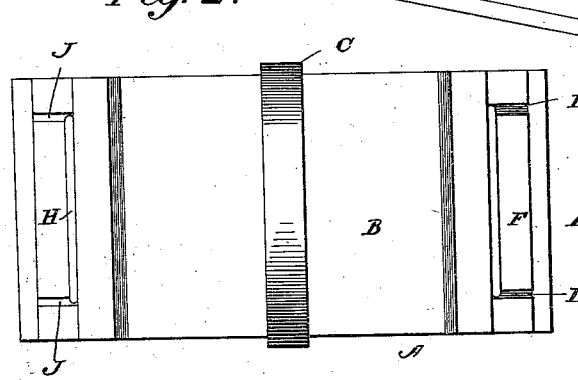
Figure 4:
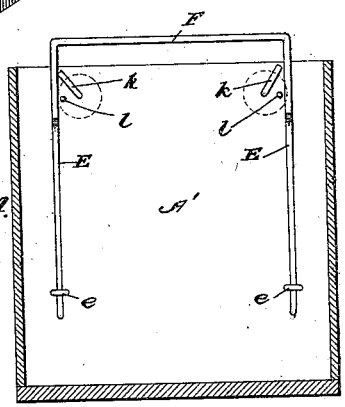
Figure 3:
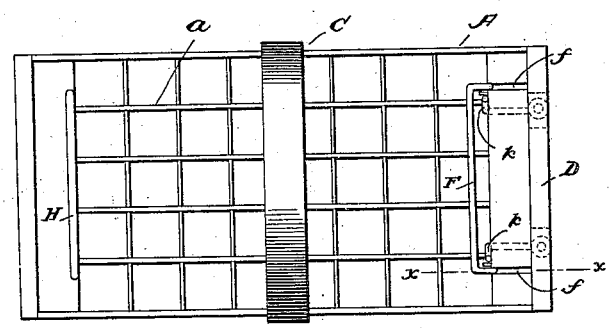
Figure 5:
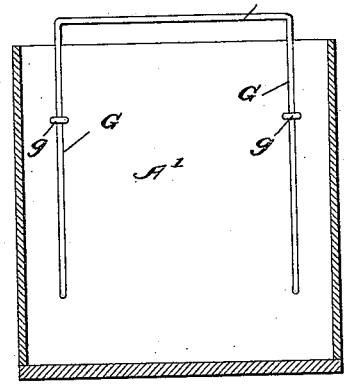

In the accompanying drawings, illustrating my invention, Figure 1 is a perspective view of my improved egg-carrying or other basket. Fig. 2 is a top plan view of the same. Fig. 3 is a top plan view with the cover removed and showing the cell-case within the basket for receiving the eggs. Fig. 4 is an inner end elevation of one end of the basket with certain parts shown in section. Fig. 5 is an inner end elevation of the opposite end of the basket, shown with certain parts in section. Fig. 6 is a transverse sectional view of one end of the basket, showing the cover-locking mechanism arranged in connection therewith.

Similar letters of reference designate corresponding parts throughout all the different figures of the drawings.

A designates a box, basket or similar produce-containing receptacle, the same being of any desired size and shape and preferably of a light, convenient and handy form, such as adapts it to be portable, in order that it may be carried about by hand, as in the service of a retail dealer in eggs and similar merchandise, for instance. This basket A may be provided interiorly with cell-case $a$, as shown in Fig. 3, for the reception of eggs, in which event the function of the basket will primarily be that of an egg-basket. I do not, however, wish to be restricted in the application of my invention to baskets designed only for the purpose of transporting eggs, but reserve the liberty of applying the invention to all kinds of baskets and receptacles of different character and purpose to which it may be found adaptable and applicable. The basket or box A is provided with a handle or bail C, which greatly enhances the value and practical utility of the basket, because it makes it better fitted for practical use.

B designates the cover of the basket or box which rests upon the open top of basket A, while over it passes the bail or handle C. This cover B is preferably provided near each end with the transverse strengthening-cleats $b$ $b$. The box or basket A has its ends A' A' provided near their upper ends with the horizontal transverse cleats D D, which not only add strength to the basket, but provide means for assisting in the handling or manipulation of the same. The cover B may be of any desired form or pattern, and I reserve the liberty of varying its construction as may be desired. It will be understood, however, that I lay no special claim to the basket broadly as a basket, or to the broad combination of a basket having a cover, or to the broad combination of a basket having a bail or handle, as I am aware that baskets possessing these characteristics have heretofore been devised and manufactured; but I do wish it distinctly understood that my invention resides essentially in the mechanism for securing the cover easily and effectively in position upon the basket, and this mechanism I will proceed to describe.

One end A' of the basket A is provided on its inner face with a spring-wire frame of rectangular form, consisting essentially of the vertical rods E E, which are connected together at their upper ends by means of the integral horizontal rod F, said horizontal rod F being at a short distance above the upper edge of the end A', and consequently above the upper edge of the basket and designed to receive beneath it the end of the cover B, as shown in Fig. 1. The lower ends of the vertical rods E E are secured to the basket end A' by means of staples e e, or any other suitable and convenient securing means, and the ends of the rods themselves are preferably pointed, bent at a right angle and driven into the basket end A', as shown in Fig. 6. The basket or box end A' is preferably provided with parallel vertical grooves f f, as shown in Fig. 6, which grooves receive the aforesaid vertical wire rods E E and permit the lower portions of the latter to lie flush with the face of the end A', while the upper parts of the rods E E are permitted a certain freedom of movement within the slots, said slots being inclined, as shown in Fig. 6, so as to permit of this horizontal deflection of the rods E, which is necessary when the cover B is being locked in place. The rectangular frame, therefore, consisting of the rods E E and the integral connecting-rod F, is capable of sufficient horizontal movement to permit it to perform its proper function in locking the cover in place.

The opposite end A' of the basket is provided with a similar rectangular wire frame, consisting of the upright portions G G connected at their upper ends by means of the horizontal part H, said part H extending above the upper edge of the end A' in like manner as does the horizontal part F, which constitutes a portion of the rectangular spring-frame belonging to the other end of the basket. The rectangular frame now being described differs from the one I have just described in being rigid and immovable instead of movable and flexible. It preserves at all times its rigid relation to the end A' to which it is firmly affixed by means of suitable staples g g, as shown in Fig. 5.

The cover B is provided at one end with a pair of parallel slots, notches, or indentations I I, which are adapted to receive the yielding wires E E, and at the other end the cover B is provided with a similar pair of slots, notches, or indentations, J J, which are adapted to engage the vertical rods G G. It will be furthermore noted that the vertical rods E are so tensioned as to normally occupy the inclined position shown in Fig. 6, and they are at one point in their length slightly bent or formed with a shoulder or offset, as shown in Fig. 6, in order to make still further pronounced the normally-inclined position which they occupy.

When the cover B is to be placed in position upon the top of the basket A, the end slots I I are first caused to embrace or engage the vertical rods E E, and as the cover is pushed endwise into position the result will be that the rods E E will be pressed into the bottom of the slots f f, the cover itself being seated beneath the horizontal rod F, and when the one end of the cover is thus placed it will be pushed sufficiently far to the right hand to enable the slots J J at the other end of the cover to engage the stationary vertical rods G G at that end of the basket, and the cover may then be shoved to the left hand until it is properly seated upon the upper end of the basket with the end which engages the rods G G neatly seated beneath the horizontal rod H in like manner as the opposite end is seated beneath the horizontal rod F, and during such left-hand movement of the cover the spring action of the vertical wires E E will cause a sufficient pressure against the cover B at the right-hand end to keep said cover in engagement with the vertical rods G G, as before specified, and consequently to hold the cover tightly and firmly upon the top of the basket, from which position it will not be easy to dislodge it without deflecting the spring-frame E E F sufficiently far to the right hand to cause a disengagement of the opposite end of the cover from the stationary wires G, which dislodgement can only ordinarily be effected by hand, although in some cases it may be accomplished by jarring or the extremely rough motion of a vehicle. To obviate this undue disengagement of the cover from the top of the basket by the disarrangement of the locking devices as I have suggested, I provide additional locking means for securing the yielding spring-frame E E F in the normally-inclined position which it is designed to occupy when the cover is in its proper position upon the basket. This additional locking means I will now describe.

The cleat D and the end A' of the basket, in connection with which end the yielding spring-frame is arranged, are provided with a couple of horizontal perforations which provide bearings or seats for the short crank-wires K K, which wires have on their inner ends the right-angled crank-arms k k and on their outer ends the I-shaped handles K' K', which are situated in countersunk openings in the cleat D. By grasping one or the other or both of these handles K' K' the user of the basket may rotate the wires K and cause the inside arms k k to travel around a greater or less arc of the circle, (shown in dotted lines in Fig. 4,) and these arms k may be caused to rest upon the projecting pins l l, which are fixed on the end A'. When the arms k so rest upon the pins l they will be behind the vertical rods E E or between said arms and the end A', as shown in Fig. 6, and consequently when they are in this position the spring-frame will be kept stationary and cannot be deflected toward the basket end A'. Therefore, when the cover B is being placed in position in the manner that I have above described the rotating crank-arms will be kept in such a situation as to permit a free yielding movement of the spring-frame, as shown in Fig. 4; but after the cover has been properly positioned and it is desired to retain it fixedly in its position the crank-arms can be rotated until they rest upon the pins l, in which case the entire mechanism will be securely locked together and no jarrings or other influence can disengage the cover.

I do not intend to be restricted to the precise construction and arrangement of parts shown and described herein, but reserve the liberty of varying therefrom within the just intent and scope of my claims.

If desired there may be a spring-frame at each end of the basket, the number of the locking-cranks may be increased or reduced, and they may be located at one or both ends of the basket, as preferred, and such other changes may be made as experience and judgment may dictate.

Having thus described my invention, what I claim as new, and desire to secure by Letters Patent, is—

1. The combination with a box or basket, of a cover whose ends are provided with indentations and the vertical wire frames on the ends of the basket for engaging said slotted cover, one of said wire frames being yielding, and the rotating crank device journaled in the end of the basket and extending to the rear of said yielding wire to lock the same over the cover, substantially as described.

2. The combination with the box or basket, of a cover having slotted ends, the spring-wire frame at one end of the basket, its lower ends being secured to the basket and its upper ends movable to engage the slots in the cover, the horizontal rotating crank-wires journaled in the end of the basket and projecting into the same at the rear of the yielding springs to lock the same, and projecting pins in the end of the basket to act as stops to said crank-wires, all substantially as set forth.

In testimony whereof I affix my signature in presence of two witnesses.

THOMAS C. BLANCHARD.

Witnesses:
 ROBT. WHITE,
 WM. R. WHITE.